(12) United States Patent
Huang

(10) Patent No.: US 6,422,891 B1
(45) Date of Patent: Jul. 23, 2002

(54) FAST CONNECTING STRUCTURE FOR FITTING LIGHTS

(75) Inventor: Peter K. H. Huang, Taipei (TW)

(73) Assignee: Shining Blick Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/547,856

(22) Filed: Apr. 12, 2000

(30) Foreign Application Priority Data

Jan. 27, 2000 (TW) .......................................... 089201479

(51) Int. Cl.[7] ................................................. H01R 13/62
(52) U.S. Cl. ........................ 439/367; 439/641; 362/249; 362/252
(58) Field of Search ................................. 439/650, 651, 439/654, 320, 322, 367, 369, 641, 281; 362/219, 249, 250, 252, 226

(56) References Cited

U.S. PATENT DOCUMENTS

| | | | | |
|---|---|---|---|---|
| 3,956,575 A | * | 5/1976 | Sutherland | 174/87 |
| 4,042,291 A | * | 8/1977 | Moriyama | 439/210 |
| 4,415,217 A | * | 11/1983 | Clabburn et al. | 439/488 |
| 4,571,018 A | * | 2/1986 | Annoot | 439/281 |
| 4,812,956 A | * | 3/1989 | Chen | 362/249 |
| 5,018,055 A | * | 5/1991 | Wu | 362/238 |
| 5,399,095 A | * | 3/1995 | West et al. | 439/320 |
| 5,559,681 A | * | 9/1996 | Duarte | 362/252 |
| 5,565,728 A | * | 10/1996 | Jung | 362/226 X |
| 5,906,513 A | * | 5/1999 | Peterson et al. | 439/320 X |
| 5,964,518 A | * | 10/1999 | Shen | 362/225 |

* cited by examiner

Primary Examiner—Brian Sircus
Assistant Examiner—Son V. Nguyen
(74) Attorney, Agent, or Firm—Troxell Law Office PLLC

(57) ABSTRACT

A fast connecting structure for fitting lights, each lamp pipe of a fitting light can be made a specific length in a factory, such as 2 m, 5 m or 10 m etc. Two ends of each lamp pipe are provided with a male and a female electrical connecting end respectively. The male and the female electrical connecting ends are provided close to them with a rotation connecting means which rotate to fast connect the lamp pipes. The rotation connecting means can also be used to fast connect a power line, an extension line and an end cap. The fitting light can be fast and conveniently connected without any tool or only with simple tools in operation.

2 Claims, 12 Drawing Sheets

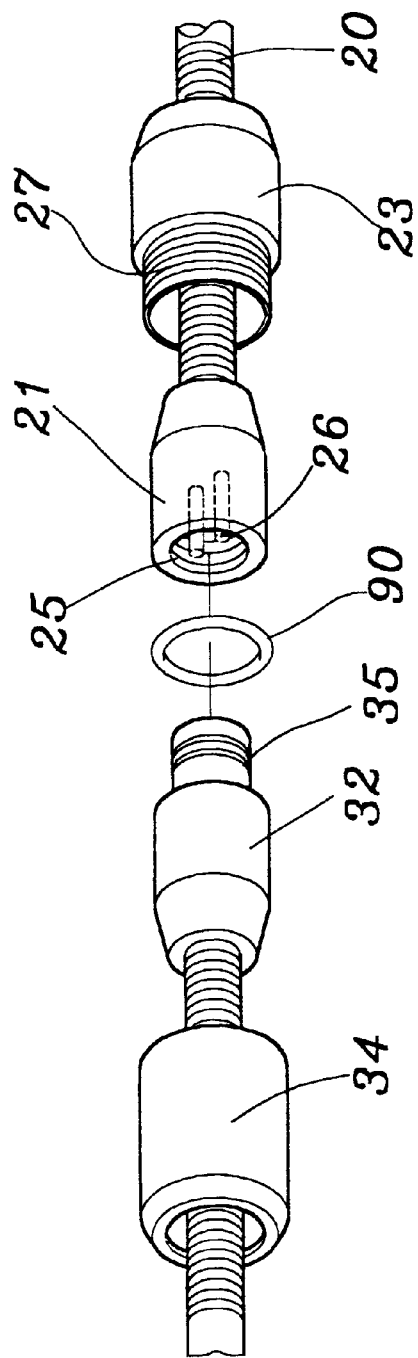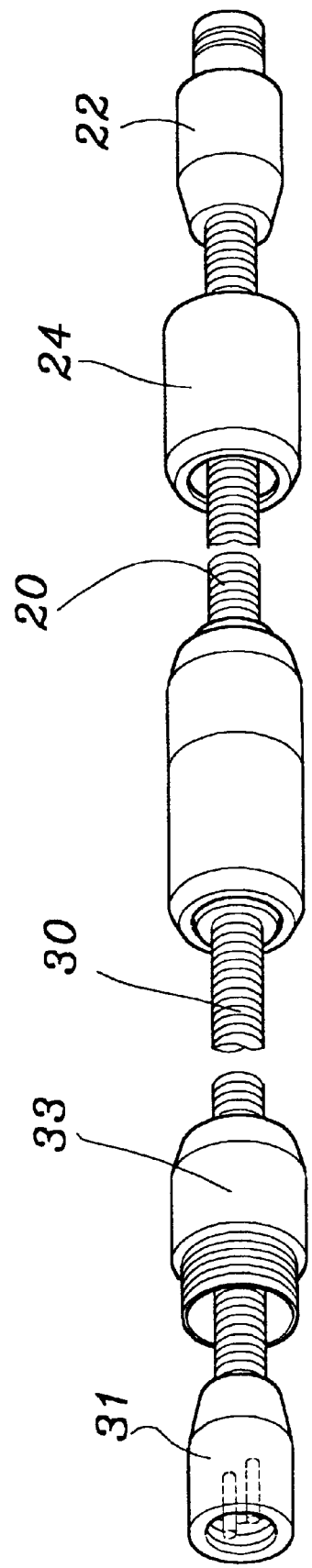

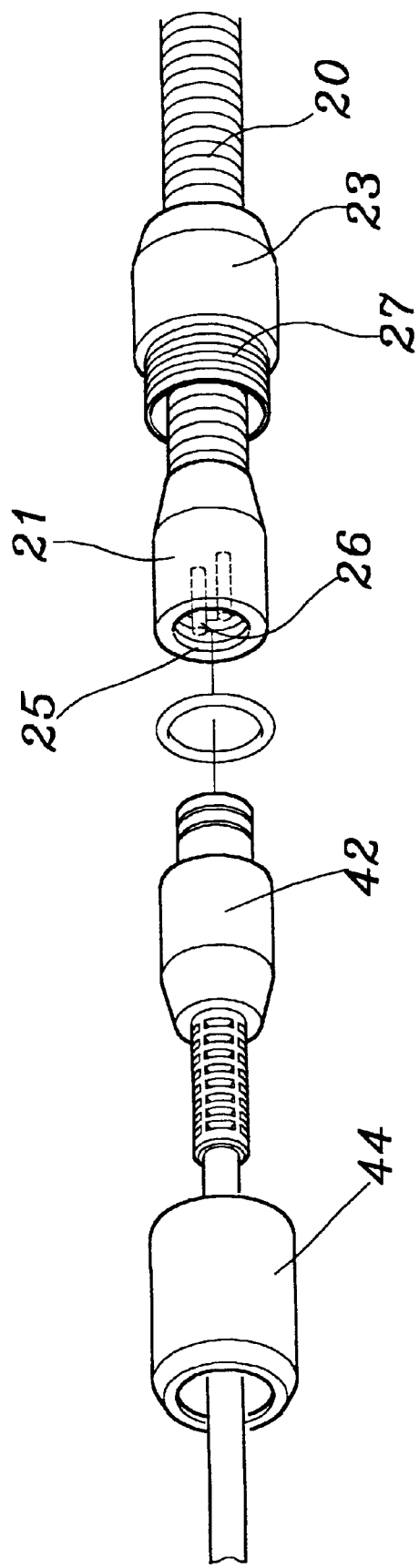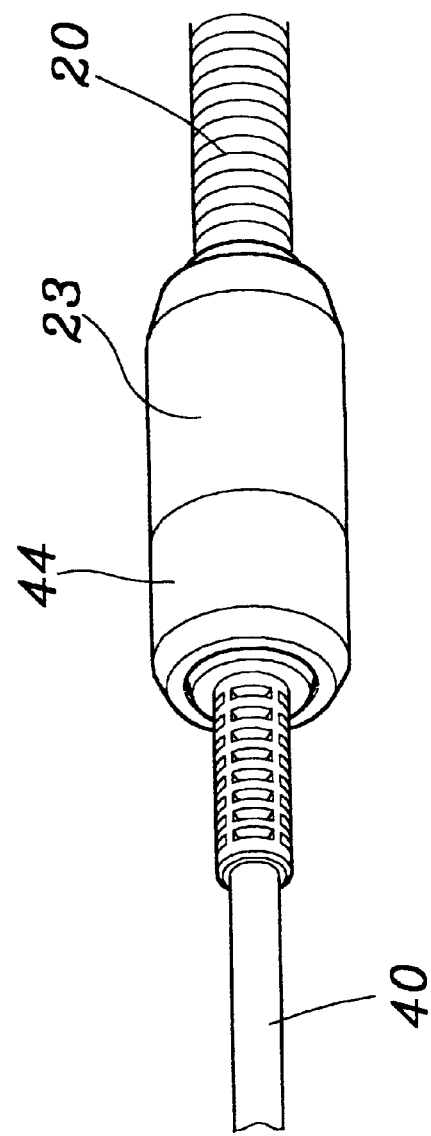
FIG. 6
FIG. 5

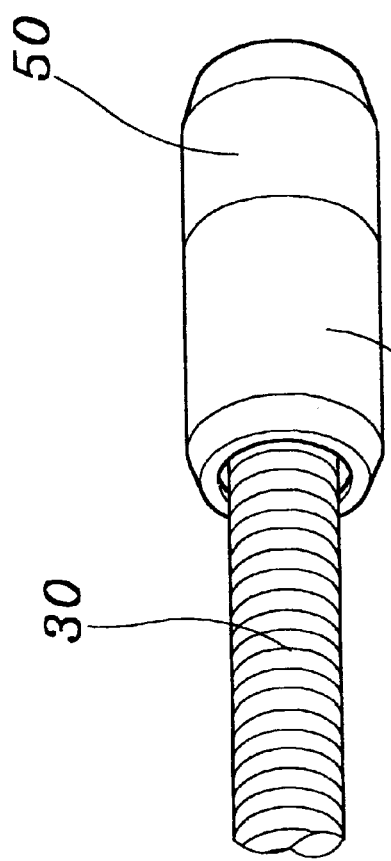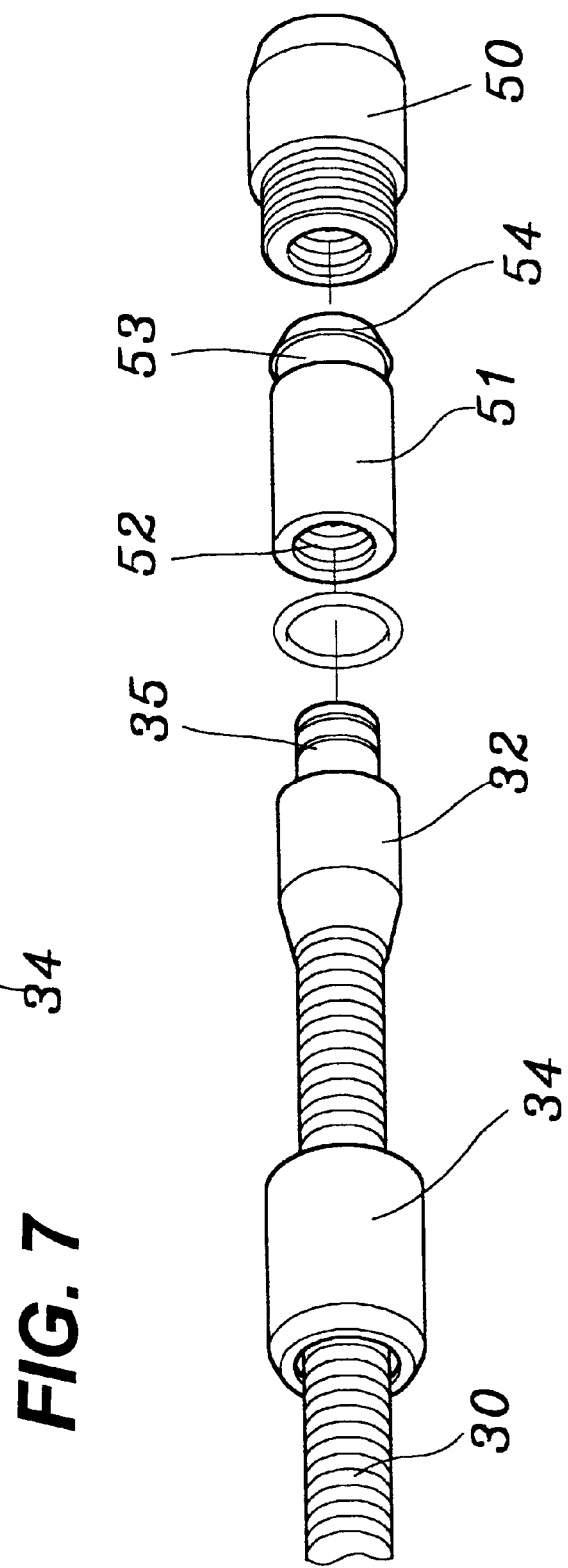

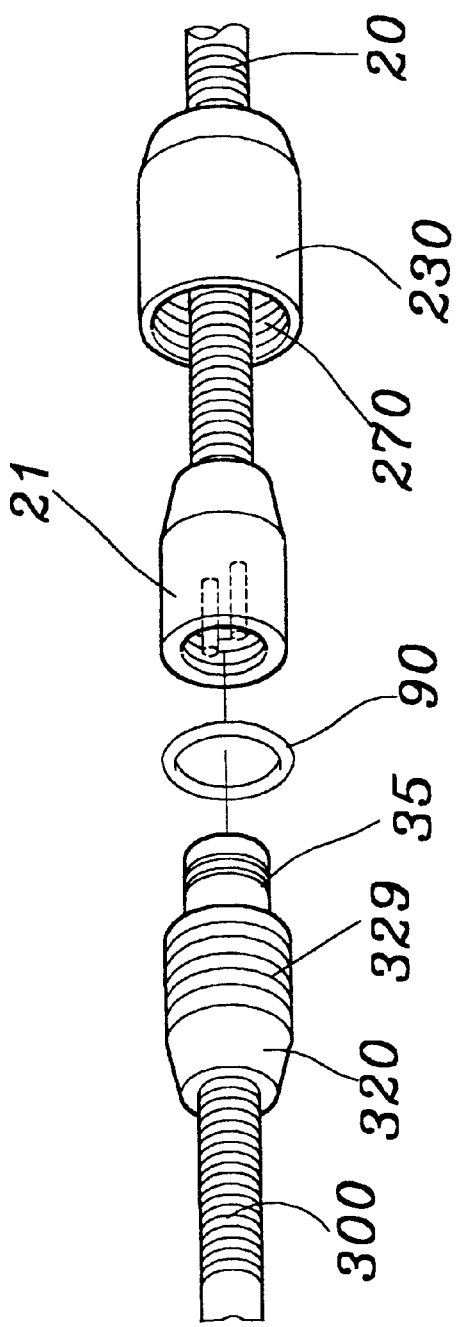
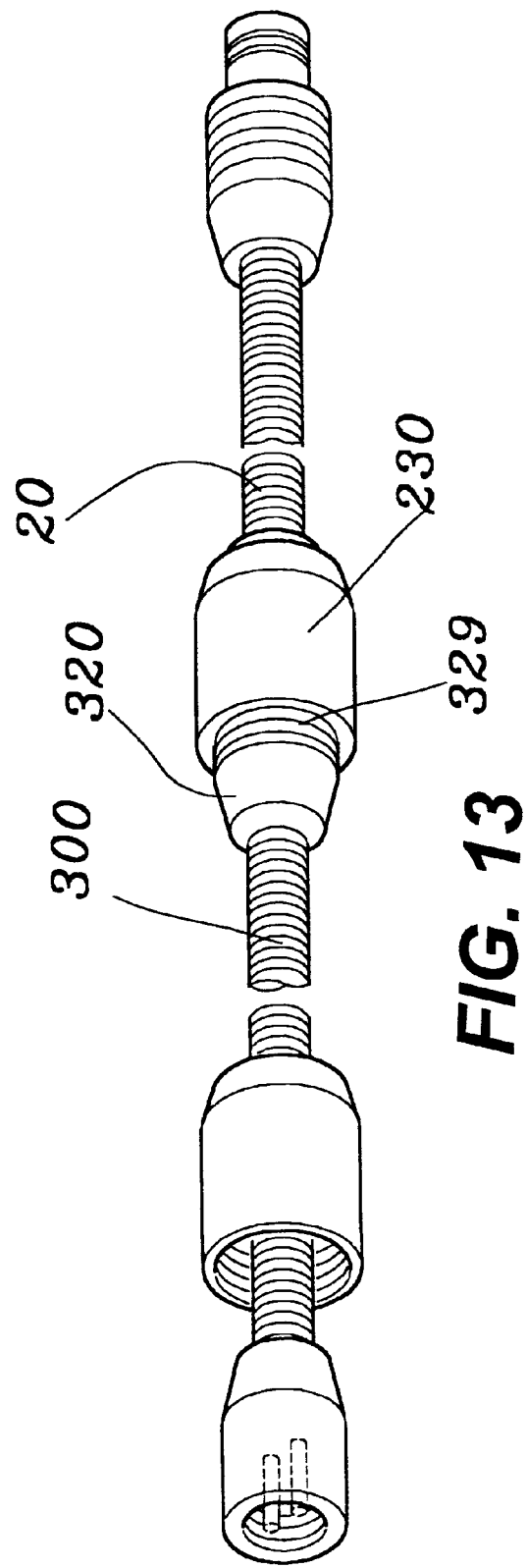
FIG. 14
FIG. 13

FAST CONNECTING STRUCTURE FOR FITTING LIGHTS

BACKGROUND OF THE INVENTION

1. Field of the Invention

The present invention is related to a fast connecting structure for fitting lights, and especially to fast and convenient connecting of a fitting light provided to be of any of various lengths by a rotation connecting means with another fitting light or with a power line and its extension line.

2. Description of the Prior Art

A fitting light or lighting rope system is a lamp string having light emitting or flashing function in a flexible and transparent pipe. It is advantageous in providing a unique decorative effect by light emitting and flashing of a lot of lamp bulbs through a transparent pipe. With the flexible structure which is plastic, the fitting light can be used in various fields for decoration with various patterns. For example, it can be hung on a surface of a building, or can be wrapped on a broad wall with a given pattern to form a marvelous and attractive large light emitting or flashing pattern. And more, it can be wrapped on any of various frames with given shapes such as the shape of a heart, a star or a snowman.

In using such a fitting light, it can have any of various decorative patterns in pursuance of designed patterns or requirement of customers. Hence in manufacturing in factories, fitting lights are all in rolled form. A user buy a fitting light in rolled form can make cutting according to indicative marks to obtain desired lengths and then the lengths are taken for connection. Such operation of connection includes connection between lamp pipes, connection between a lamp pipe with a power line etc.

FIG. 1 shows a way of connection for such a lamp pipe of a conventional fitting light, wherein, a power line 10 is provided on one end thereof with an end piece 11, the corresponding end of a lamp pipe 12 of the fitting light is provided with two holes 121, 122 for connecting. A connecting seat 13 is provided on both sides thereof with metallic guide pins 131, 132 capable of inserting into the end piece 11 and the holes 121, 122 of the lamp pipe 12. Then a connector is used to connect them. The connector generally used includes two semi-cylindrical housings 14, 15, the semi-cylindrical housing 14 is provided on the four inner corners thereof with four screw holes 16, while the semi-cylindrical housing 15 is provided on the four corresponding inner corners thereof with four through holes 17, screws 18 can be screwed therein to connect the power line 10 and the lamp pipe 12 of the fitting light.

Such a connector for conventional fitting lights must have a tool to screw in the multiple screws 18, operation of connection by it is troublesome, time consuming and inconvenient. And existing fitting lights are sold to customers or users in rolls, they are bothersome in operations of cutting and mounting for connecting by customers, the optional connecting work with desired lengths of lamp pipes of a fitting light cut from the rolls often does not meet the requirement of safety in many countries. And even some countries do not permit using in the markets of such cut products.

SUMMARY OF THE INVENTION

The object of the present invention is to provide a fast connecting structure for lamp pipes of a fitting light, with which, two lamp pipes can be butt jointed fast and conveniently without any tool or technique. The pipes of the fitting light can also be conveniently connected to a power line or an extension line or end caps.

To obtain the object, the lamp pipes of a fitting light of the present invention are made in different lengths in a factory, two ends of each length are provided with a male and a female electrical connecting end respectively, the male and the female electrical connecting ends are directly molding formed on and matchable with the lamp pipes and are provided close to themselves with rotation connecting means having been provided over the lamp pipes, so that the rotation connecting means can be rotated to connect the pipes of the fitting light when the male and the female electrical connecting ends are butt connected.

The rotation connecting means mentioned can be a male sleeve and a female sleeve in pair and can be screw connected with each other. The sleeves can be both or either movable.

In connecting the lamp pipes of the fitting light stated above in pursuance of their predetermined lengths, one end of the power line can be provided with a connecting end and a sleeve for fast connecting too.

In an embodiment of the present invention, the rotation connecting means can be a single sleeve and a rotation connecting portion provided on an opposite end.

In another embodiment of the present invention, the rotation connecting means can be mutually opposite sleeves capable of locking by diversion after butt insertion.

The terminal ends of the pipes of the fitting light can also make connection of the pipes with end caps.

The present invention will be apparent in its novelty and features after reading the detailed description of the preferred embodiment thereof in reference to the accompanying drawings.

BRIEF DESCRIPTION OF THE DRAWINGS

FIG. 2 is a perspective view showing connection of two lamp pipes of a fitting light of the present invention;

FIG. 3 is a perspective view analytically showing the connecting joint of FIG. 2;

FIG. 5 is a perspective view showing connection of a lamp pipe of a fitting light of the present invention with the power line;

FIG. 6 is a perspective view analytically showing the connecting joint of FIG. 5;

FIG. 7 is a perspective view showing connection of a lamp pipe of a fitting light of the present invention with an end sleeve;

FIG. 8 is a perspective view analytically showing the connecting joint of FIG. 7;

FIG. 13 is a perspective view showing connection of the third embodiment of the present invention;

FIG. 14 is a perspective view analytically showing the connecting joint of FIG. 13;

DETAILED DESCRIPTION OF THE PREFERRED EMBODIMENT

Figure 1:
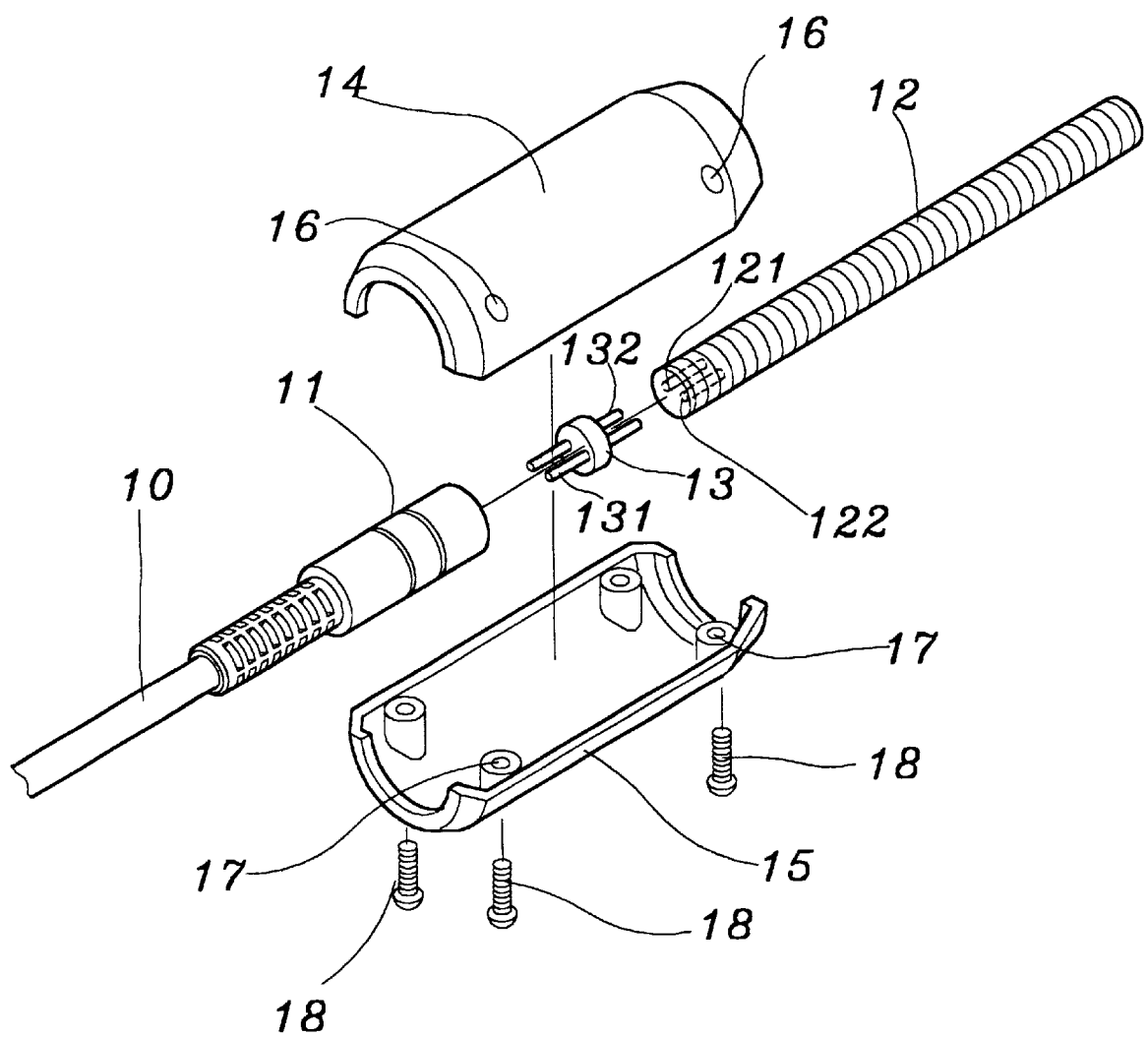
FIG. 1 is an anatomic perspective view showing the structure of a conventional fitting light.

Referring to FIG. 2, 3 which shows connection of two assembled lamp pipes 20, 30 of a fitting light of the present invention, each of the lamp pipes 20, 30 can be made a specific length in a factory, such as 2 m, 5 m or 10 m etc. The lamp pipe 20, for example, can be provided on one end thereof with a male electrical connecting end 21, while the on the other end thereof with a female electrical connecting end 22, both the male and female electrical connecting ends 21, 22 are molding formed on and matchable with the lamp pipe 20. The lamp pipe 30 connecting with the lamp pipe 20 is provided, in a contrary sequence, on one end thereof with a male electrical connecting end 31, while on the other end thereof with a female electrical connecting end 32, both the male and female electrical connecting ends 31, 32 are molding formed on and matchable with the lamp pipe 30. The male and the female electrical connecting ends 21, 22, 31, 32 are provided close to themselves with rotation connecting means having been provided over the lamp pipes 20, 30. In this embodiment, the rotation connecting means are male external sleeves and female external sleeves 23, 24, 33, 34 and can be screw connected. The male and the female electrical connecting ends 21, 22, 31, 32 are preferably embedded guide pins or insertion holes as are shown in the drawings, the connecting joint of them can be provided with a gasket 90 for sealing.

The lamp pipes 20, 30 includes light emitting and flashing lamp bulbs under control and provided in a transparent pipe, they emit light and flash when are connected to a power source.

Figure 4:
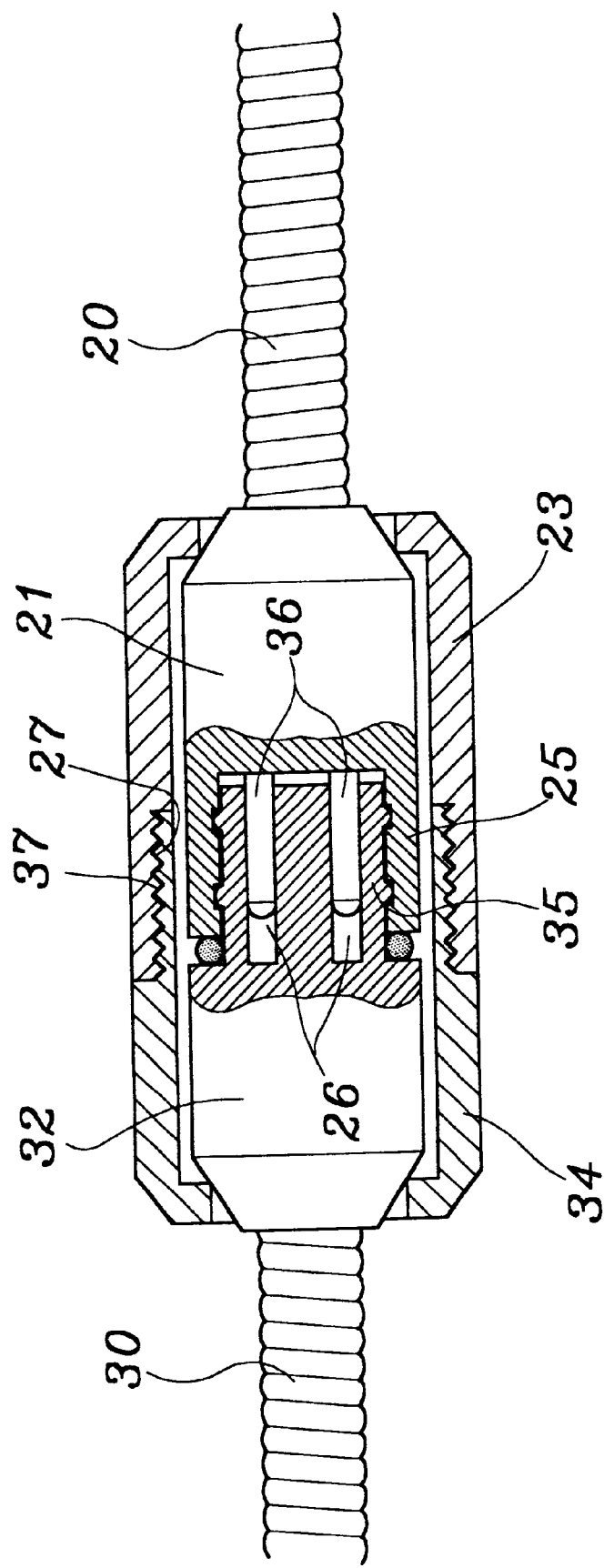
FIG. 4 is a sectional view taken from FIG. 2.

When the lamp pipes 20, 30 are butt connected with each other as shown in the drawings, a guide member 35 on the female electrical connecting end 32 of the lamp pipe 30 enters an internal hole 25 on the male electrical connecting end 21 of the lamp pipe 20, so that a pair of internal insertion holes 36 provided in the guide member 35 slip over a pair of guide pins 26 on the male electrical connecting end 21 (referring to FIG. 4). Thus the primary connection of the two lamp pipes 20, 30 is completed. Thereafter, an external thread 27 provided on the male sleeve 23 of the lamp pipe 20 is screwed in an internal hole 37 on the female sleeve 34 of the lamp pipe 30 to complete the connection operation as shown in FIGS. 2 and 4.

In the embodiment as depicted in FIG. 5 and 6 showing connection of a lamp pipe 20 of a fitting light of the present invention with a power line 40, the power line 40 is provided on one end thereof with a plug (not shown), and on the other end thereof with a female electrical connecting end 42 and a female external sleeve 44 in the shapes identical to those on the butt connecting end of the lamp pipe 30. In this way, the lamp pipe 20 can be fast connected to the power line 40.

The lamp pipe 30 shown in FIG. 7 and 8 is connected on the end thereof with an end cap 50. The end cap 50 is provided with an internal liner 51 which is provided with an internal hole 52 mating with the guide member 35 and provided on the tailing end thereof with a snap connecting portion 54 having a neck portion 53 and capable of mating and connecting with an end hole on the end cap 50.

Figure 9:
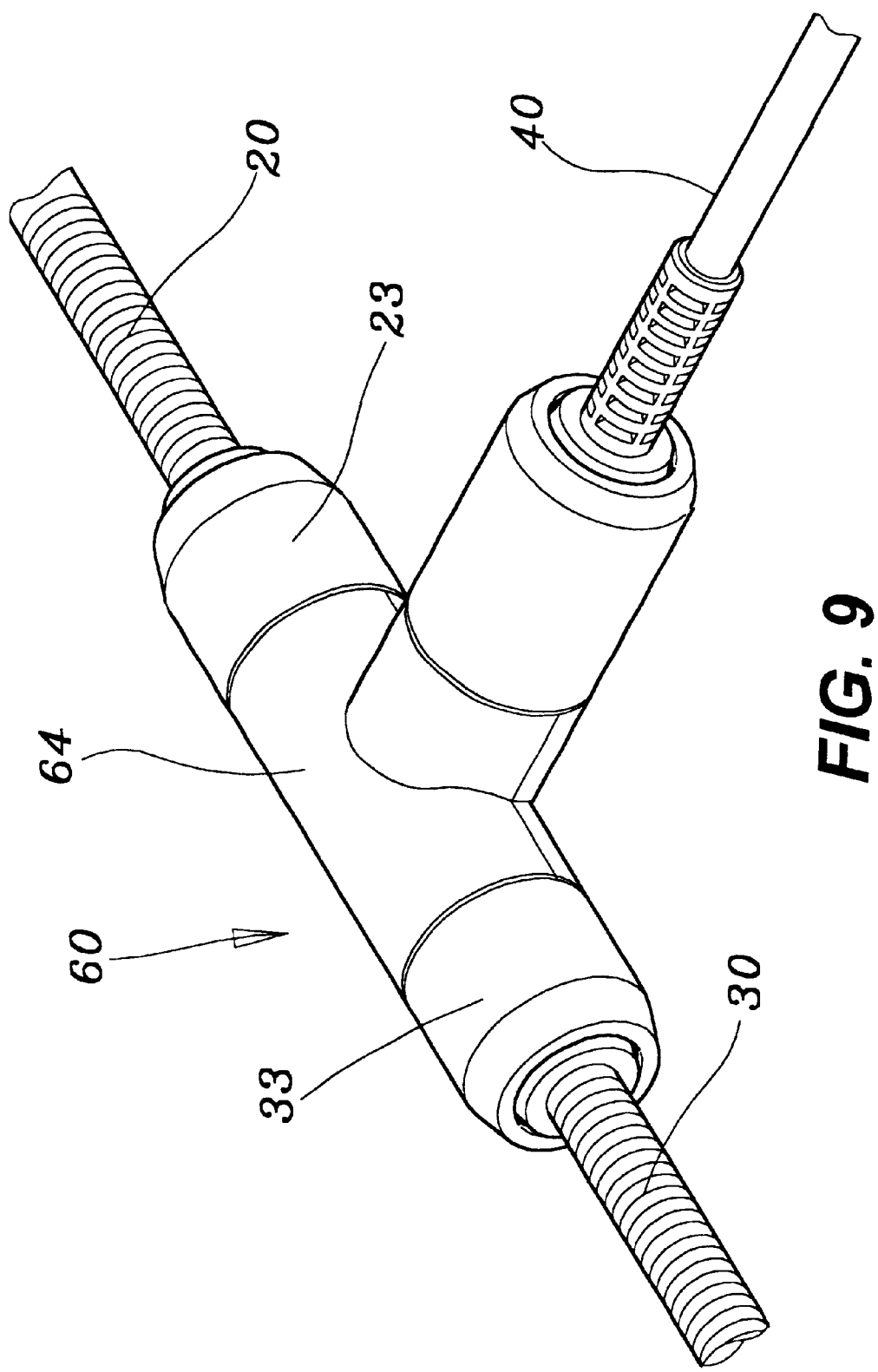
FIG. 9 is a perspective view showing connection of the present invention in multiple directions.
Figure 10:
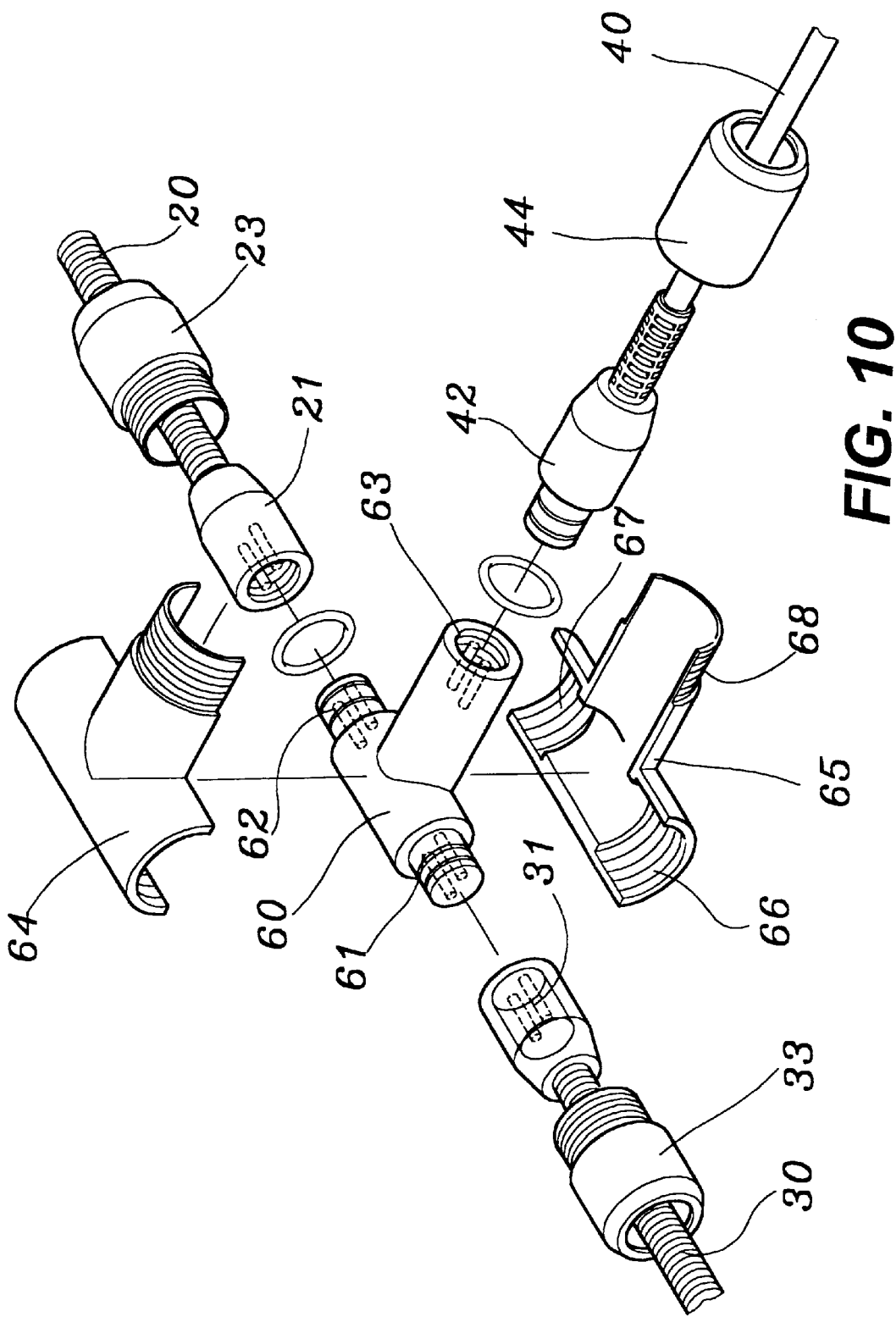
FIG. 10 is a perspective view analytically showing the connecting joint of FIG. 9.

In the embodiment as depicted in FIGS. 9 and 10 showing connection of the present invention in multiple directions. Wherein, a power line 40 is connected with two lamp pipes 20, 30. Such a connection state includes a manifold 60 for connecting of ends; the manifold 60 is provided with male and the female electrical connecting ends 61, 62, 63, two semi housings 64, 65 provided with internal and external threaded sleeve portions 66, 67 and 68 are put together to fast screw-locking the male sleeves and female sleeves 23, 33 and 44 for the lamp pipes 20, 30 and 40 to be connected.

Figure 11:
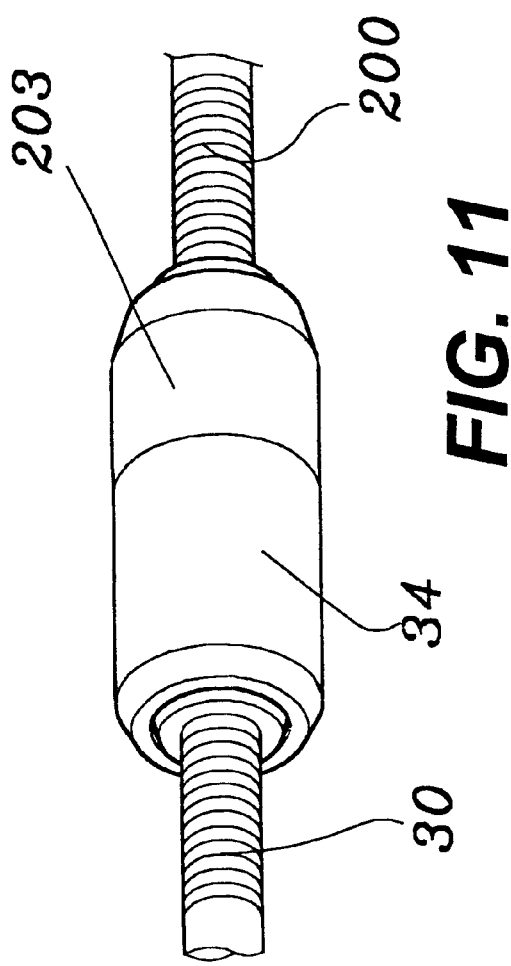
FIG. 11 is a perspective view showing connection of the second embodiment of the present invention.
Figure 12:
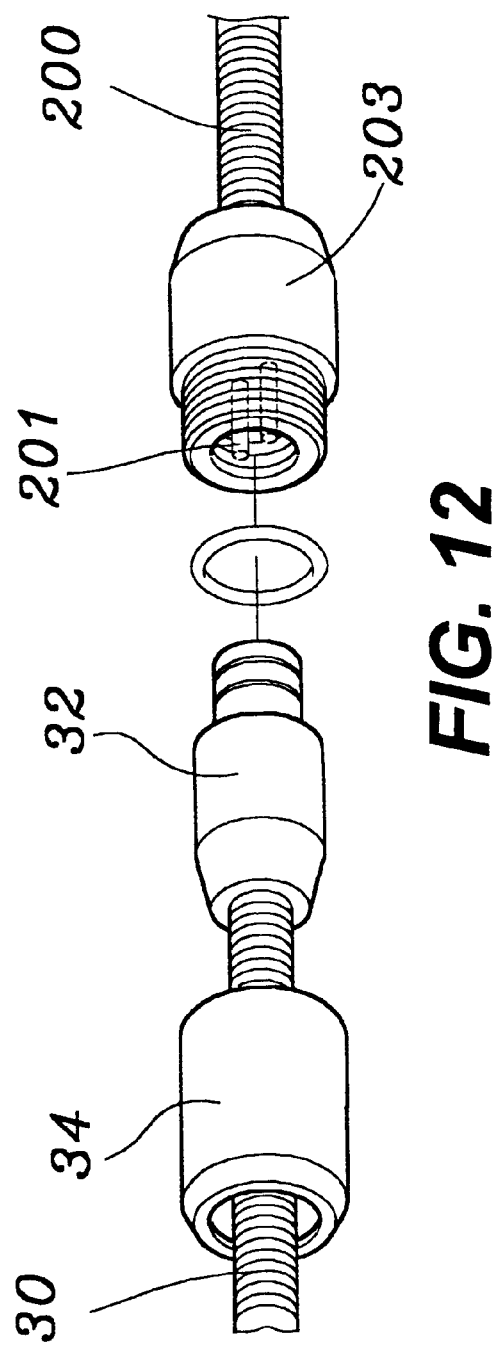
FIG. 12 is a perspective view analytically showing the connecting joint of FIG. 11.

In the embodiment as depicted in FIG. 11 and 12 showing connection of the second embodiment of the present invention, a lamp pipe 200 is connected with the abovementioned lamp pipe 30. The lamp pipe 200 has a male electrical connecting end 201 thereof integrally and fixedly connected with an external sleeve 203, so that when the female electrical connecting end 32 of the lamp pipe 30 can be connected with the male electrical connecting end 201, and then a movable external sleeve 34 is screw connected with the external sleeve 203 of the lamp pipe 200.

Figure 15:
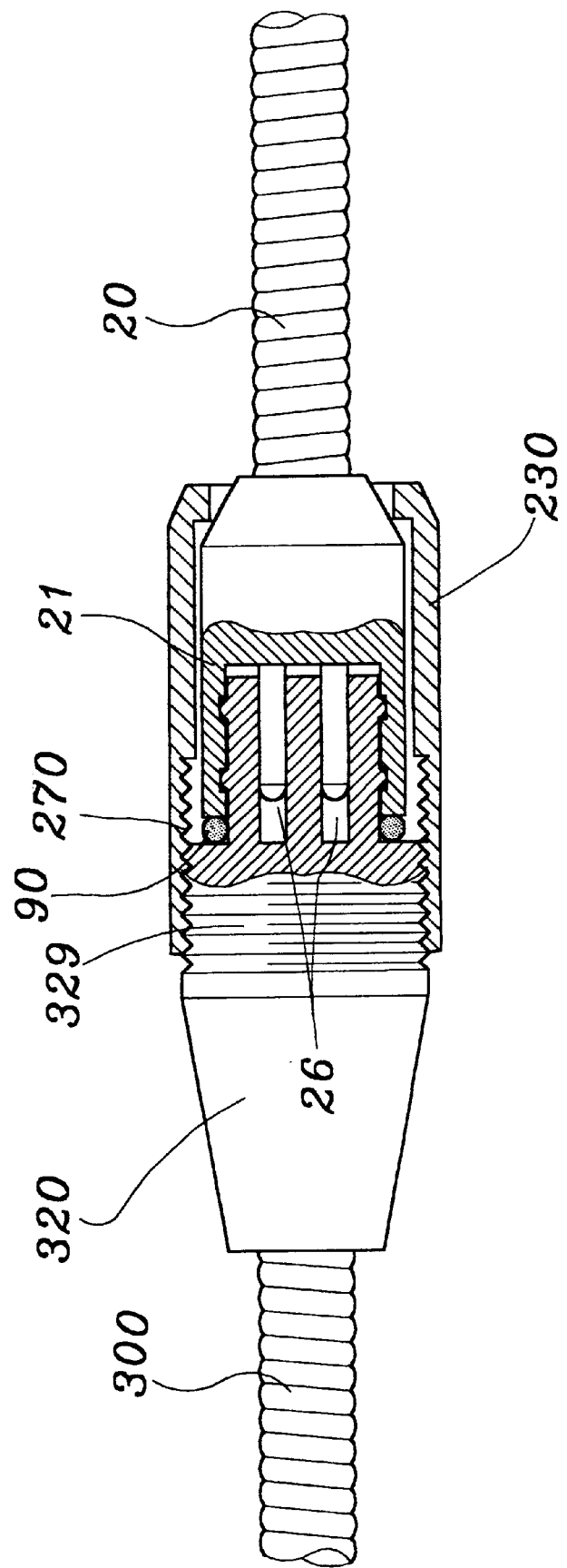
FIG. 15 is a sectional view taken from FIG. 14.
Figure 16:
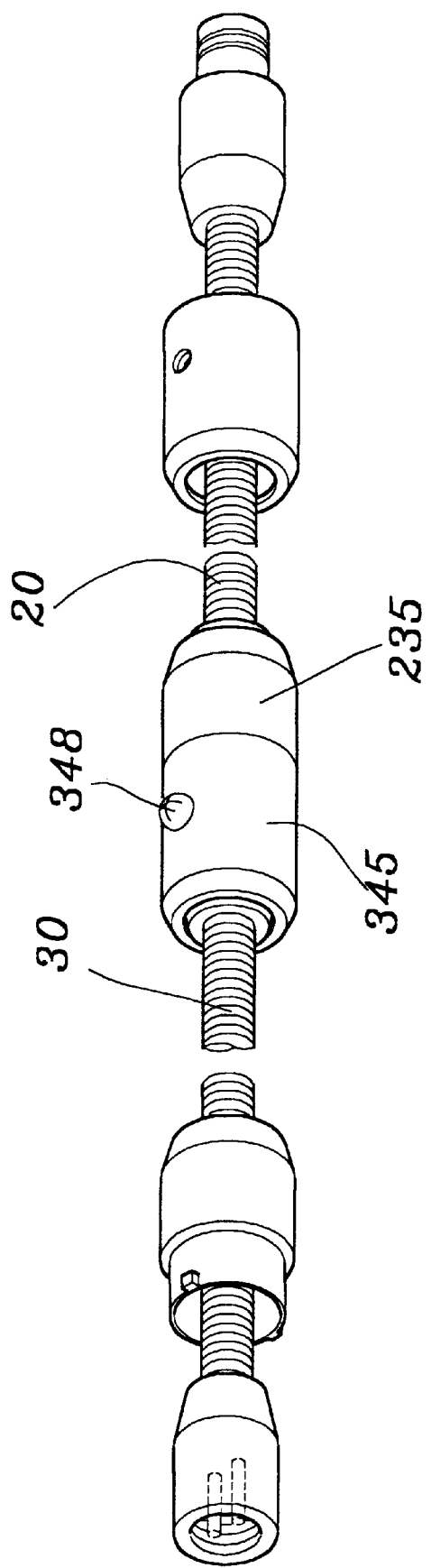
Figure 17:
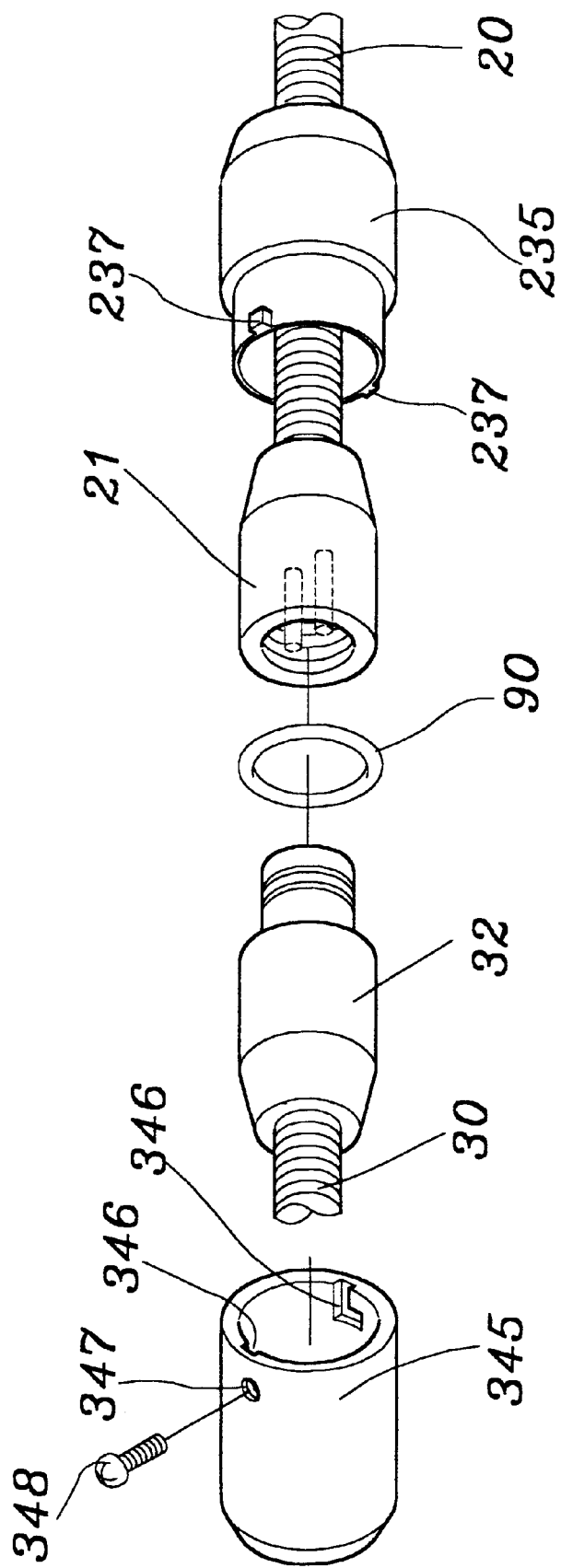

In the embodiment as depicted in FIGS. 13 to 15 showing connection of the third embodiment of the present invention, an end sleeve 230 on one end of the lamp pipe 20 is provided with an internal thread 270, the other end thereof and the corresponding end thereof and that of the lamp pipe 300 can have their external threads 329 directly formed on a electrical connecting end 320 thereof. This embodiment can have the volume after assembling effectively reduced; and during the process of screw connection, the two lamp pipes 20, 300 displace axially, so that connection of the male and the female electrical connecting ends can be firmer and reliable. This embodiment can use only a single external sleeve provided therein with two threads in predetermined lengths and mutually contrary directions; so that when in rotating, the male and the female electrical connecting ends of the mutually opposite lamp pipes with threads formed in advance can make connection of the ends.

The lamp pipes of a fitting light of the present invention are of predetermined shape with various lengths, they do not need cutting from the roll of lamp pipe, but can well meet the severe requirement in the safety specifications. Connection between lamp pipes, a lamp pipe and a power line or a lamp pipe and an extension line needs only to connect the male and the female electrical connecting ends, then to rotate the rotation connecting means or to rotate to make a diversion for locking, and connection is completed. These are done without any connecting tool; rather, only a simple way of operation is utilized in locking a single screw. Therefore, assembling and disassembling of the present invention is easy, and connecting operation in the spot can be faster and more convenient.

The embodiments mentioned above are only for illustrating the present invention, and not for giving any limitation to the scope of the present invention. It will be apparent to those skilled in this art that various modifications or changes can be made to the elements of the present invention without departing from the spirit, scope and of this invention and fall within the scope of the appended claims and are intended to form part of this invention.

What is claimed is:

1. A lamp pipe assembly comprising:
   a) a first lamp pipe having a plurality of lamp bulbs in an elongated flexible pipe, the first lamp pipe having a predetermined length, with first and second ends;
   b) a first male electrical connector mounted on the first end of the first lamp pipe;
   c) a first female electrical connector mounted on the second end of the first lamp pipe;
   d) a first male external sleeve mounted on one of the first and second ends of the first lamp pipe;

e) a first female external sleeve mounted on one of the first and second ends of the first lamp pipe opposite to the male external sleeve;

f) a manifold having a plurality of electrical connectors, one of the plurality of electrical connectors being connected to one of the first male and first female electrical connectors of the first lamp pipe;

g) a housing enclosing the manifold and having a housing connector associated with each of the plurality of electrical connectors, one of the first male and first female external sleeves of the first lamp pipe connected to one of the housing connectors so as to connect the first lamp pipe and the manifold together;

h) a second lamp pipe having a plurality of lamp bulbs in an elongated flexible tube, the second lamp pipe having a second predetermined length, and third and fourth ends;

i) a second male electrical connector mounted on the third end;

j) a second female electrical connector mounted on the fourth end;

k) a second male external sleeve mounted on one of the third and fourth ends; and l) a second female external sleeve mounted on one of the third and fourth ends opposite to the second male external sleeve, one of the second male and second female external sleeves of the second lamp pipe connected to one of the housing connectors of the manifold so as to connect the second lamp pipe and the manifold together.

2. The lamp pipe assembly of claim 1 further comprising:

a) a power line having an electrical connector connected to one of the electrical connectors of the manifold; and b) a power line external sleeve mounted on the power line and connected to one of the housing connectors so as to connect the power line and the manifold together.

* * * * *